(12) United States Patent
Ikegami et al.

(10) Patent No.: US 9,002,013 B2
(45) Date of Patent: Apr. 7, 2015

(54) SYSTEM AND APPARATUS FOR INFORMATION DISPLAY

(75) Inventors: Fumihiko Ikegami, Kanagawa-ken (JP);
Shinya Murai, Kanagawa-ken (JP);
Shogo Yamaguchi, Kanagawa-ken (JP);
Takeo Horiguchi, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1359 days.

(21) Appl. No.: 11/961,161

(22) Filed: Dec. 20, 2007

(65) Prior Publication Data
US 2008/0107270 A1    May 8, 2008

Related U.S. Application Data

(63) Continuation of application No. 10/784,735, filed on Feb. 24, 2004, now Pat. No. 7,337,325.

(30) Foreign Application Priority Data

Feb. 25, 2003  (JP) .................................. 2003-47122

(51) Int. Cl.
| | |
|---|---|
| H04L 9/00 | (2006.01) |
| H04L 9/32 | (2006.01) |
| H04N 7/167 | (2011.01) |
| H04N 21/41 | (2011.01) |
| H04N 21/4408 | (2011.01) |
| H04N 21/6334 | (2011.01) |
| H04N 21/6377 | (2011.01) |
| H04L 29/06 | (2006.01) |

(52) U.S. Cl.
CPC .............. *H04L 9/3271* (2013.01); *H04L 63/062* (2013.01); *H04L 63/08* (2013.01); *H04L 63/12* (2013.01); *H04N 7/1675* (2013.01); *H04N 21/4126* (2013.01); *H04N 21/4408* (2013.01); *H04N 21/63345* (2013.01); *H04N 21/63775* (2013.01); *H04L 2209/80* (2013.01)

(58) Field of Classification Search
USPC ................................ 380/277; 713/193; 1/277
See application file for complete search history.

(56) References Cited

U.S. PATENT DOCUMENTS

| | | |
|---|---|---|
| 4,731,810 A | 3/1988 | Watkins |
| 4,812,820 A | 3/1989 | Chatwin |

(Continued)

FOREIGN PATENT DOCUMENTS

| | | | | |
|---|---|---|---|---|
| JP | 2002-218420 | | 8/2002 | |
| JP | 2002218420 | * | 8/2002 | ................ G06F 3/00 |

*Primary Examiner* — Azizul Choudhury
*Assistant Examiner* — Tariq Najee-Ullah
(74) *Attorney, Agent, or Firm* — Oblon, McClelland, Maier & Neustadt, L.L.P.

(57) ABSTRACT

An apparatus for displaying information received from a communication apparatus including a key information producing unit configured to produce key information used to authenticate the communication apparatus; a key information distributing unit configured to distribute the key information; an authentication information receiving unit configured to receive authentication information; an authenticating unit configured to authenticate the communication apparatus by verifying whether or not the authentication information was formed based upon the key information; and a display information receiving unit configured to receive display information from the authenticated communication apparatus, wherein the authenticated communication apparatus has a distribution range during reception of the key information such that the outputted key information can be acquired.

21 Claims, 7 Drawing Sheets

(56) References Cited

U.S. PATENT DOCUMENTS

| | | | |
|---|---|---|---|
| 5,040,335 A | 8/1991 | Grimes | |
| 6,438,594 B1* | 8/2002 | Bowman-Amuah | 709/225 |
| 7,117,331 B2* | 10/2006 | Uchiumi et al. | 711/164 |
| 7,296,091 B1* | 11/2007 | Dutta et al. | 709/245 |
| 7,539,306 B2* | 5/2009 | Ohta et al. | 380/201 |
| 7,542,571 B2* | 6/2009 | Asadu | 380/277 |
| 2001/0033660 A1* | 10/2001 | Maeda | 380/232 |
| 2001/0037307 A1* | 11/2001 | Kori et al. | 705/57 |
| 2002/0184310 A1* | 12/2002 | Traversat et al. | 709/204 |
| 2003/0016827 A1* | 1/2003 | Asano et al. | 380/277 |
| 2003/0030720 A1* | 2/2003 | Hutchings | 348/14.02 |
| 2003/0058810 A1* | 3/2003 | Petronic | 370/316 |
| 2003/0149874 A1* | 8/2003 | Balfanz et al. | 713/168 |
| 2004/0078066 A1* | 4/2004 | Ohta et al. | 607/60 |
| 2004/0078336 A1* | 4/2004 | Asadu | 705/51 |
| 2004/0090466 A1* | 5/2004 | Loveria, III | 345/781 |
| 2004/0177253 A1* | 9/2004 | Wu et al. | 713/176 |
| 2004/0212503 A1* | 10/2004 | Stilp | 340/572.1 |
| 2005/0036509 A1* | 2/2005 | Acharya et al. | 370/466 |
| 2005/0198434 A1* | 9/2005 | Uchiumi et al. | 711/113 |
| 2006/0048196 A1* | 3/2006 | Yau | 725/81 |

* cited by examiner

SYSTEM AND APPARATUS FOR INFORMATION DISPLAY

CROSS-REFERENCE TO RELATED APPLICATIONS

This application is a continuation of U.S. patent application Ser. No. 10/784,735 filed Feb. 24, 2004 and claims the benefit of priority under 35 U.S.C. §119 to Japanese Patent Application No. 2003-47122, filed Feb. 25, 2003, the entire contents of which are herein incorporated by reference.

BACKGROUND OF THE INVENTION

1. Field of the Invention

The present invention relates generally to an information display apparatus, an information display method, and an information display system.

2. Description of the Related Art

Portable communication devices, such as notebook PCs (personal computers) and PDAs (personal digital assistants) have recently become popular. Very recently, generally speaking, participants of conferences or other events (hereafter conferences) bring their own portable communication devices into the conference. Presentations are facilitated by operating these portable communication devices.

For example, a presenter at a conference usually stores materials for his presentation in his own communication apparatus as electronic data. During the presentation, the electronic data stored in the presenter's communication apparatus is outputted by way of an information output apparatus, such as a projector, a television, a monitor, a speaker, or the like.

Generally speaking, the communication apparatus of the speaker is conventionally connected to the information output apparatus via a cable, such as, for example, a serial cable or a video cable.

Very recently, since wireless communication devices have become more popular, the communication apparatus of the presenter may be wirelessly connected to the information output apparatus. Using a wireless connection, cumbersome cables are no longer required, and the communication apparatus may be positioned at a variety of locations.

However, there is a risk when using wireless connections that a third party having ill will may intentionally disturb the progress of the presentation by connecting his own communication apparatus to the information output apparatus. Additionally, a third party may acquire data transmitted/received between the communication apparatus of the presenter and the information output apparatus in an unfair manner. When the presenter's communication apparatus is connected to the information output device by a cable, this risk is not present.

To solve this security problem, an encryption idea may be conceived. That is, the data transmitted/received between the communication apparatus of the presenter and the information output apparatus may be encrypted. For instance, an encryption key may be distributed to authorized participants for a conference.

In a location where a conference is held, a presenter having an encryption key can encrypt data via a communication apparatus and transmit the encrypted data to an information output apparatus, which can decode the encrypted data to output the decoded data. Also, other participants having the encryption key may decode the data transmitted by the presenter using their own communication devices, so that these participants may view or hear the content of the presentation.

However, since the encryption keys are previously distributed, it is possible that the encryption keys might be given to an unauthorized person. Also, if an authorized participant forgets the encryption key, this person cannot make the presentation, cannot view the content of the presentation, or cannot hear the presentation. Thus, it is evident that distributing encryption keys in advance has disadvantages.

Patent Publication No. 2002-218420 (Kokai) describes a potential solution for when a third party having good will mistakenly transmits data and interferes with a presentation made by another person. For example, a method may be conceived in which a participant inputs discrimination information for an information output apparatus from which image information is desired. This communication apparatus transmits both the entered discrimination information and image information desired from an information output apparatus to the information output apparatus from which the image information is sought to be outputted. This information output apparatus outputs the received image information only when the received discrimination information coincides with the user's own discrimination information.

This method prevents against accidental interference by a third party. However, since the discrimination information is directly transmitted without being protected by encryption, it is possible that the discrimination information might be stolen by unauthorized third parties. As a consequence, this method cannot prevent access by malicious third parties.

On the other hand, participants in a conference are often acquainted with each other. Even when someone who is not acquainted with the other participants is present, the identity of the participant may be confirmed by employing an authentication tool, such as digital authentication or an identification card. In such a case, a suspicious character located in an assembly hall of a conference may be identified, and may be expelled from the assembly hall.

BRIEF SUMMARY OF THE INVENTION

Assuming that anyone who is present in an assembly hall of a conference is an authorized participant, an object of the present invention is to provide an information output apparatus, an information output system, and an information output method, capable of preventing the disturbance of a presentation by an unauthorized third party, and also capable of preventing theft of contents of a presentation by an unauthorized third party.

According to a first aspect of the present invention, an apparatus is provided for displaying information received from a communication apparatus, the apparatus including: a key information producing unit configured to produce key information used to authenticate said communication apparatus; a key information display unit configured to display said key information; an authentication information receiving unit configured to receive authentication information; an authenticating unit configured to authenticate said communication apparatus by verifying whether or not said authentication information was formed based upon said key information; and a display information receiving unit configured to receive display information from said authenticated communication apparatus, wherein said authenticated communication apparatus has a distribution range of said key information such that said key information displayed on said key information display unit can be viewed.

A second aspect of the invention provides an apparatus for displaying information received from a communication apparatus, the apparatus including: a key information producing unit configured to produce key information used to authenticate said communication apparatus; a key information output unit configured to output sound to distribute said key information; an authentication information receiving unit configured to receive authentication information; an authenticating unit configured to authenticate said communication apparatus by verifying whether or not said authentication information was formed based upon said key information; and a display information receiving unit configured to receive display information from said authenticated communication apparatus, wherein said authenticated communication apparatus has a distribution range of said key information such that a sound outputted by said key information output unit can be heard.

Another aspect of the present invention provides an apparatus for displaying information received from a communication apparatus including: a key information producing unit configured to produce key information used to authenticate said communication apparatus; a key information transmitting unit configured to transmit said key information by infrared transmission to distribute said key information; an authentication information receiving unit configured to receive authentication information; an authenticating unit configured to authenticate a communication apparatus by verifying whether or not said authentication information was formed based upon said key information; and a display information receiving unit configured to receive display information from said authenticated communication apparatus as display information to be displayed, wherein said authenticated communication apparatus has a distribution range of said key information such that the infrared rays transmitted by said key information transmitting unit can be received.

Yet another aspect of the present invention includes method used in an information display apparatus for displaying information received from a communication apparatus, the method including: producing key information used to authenticate said communication apparatus; distributing said key information; receiving authentication information for authenticating said communication apparatus; authenticating said communication apparatus by verifying whether or not said authentication information was formed based upon said key information; and receiving display information of said authenticated communication apparatus to display information, wherein said authenticated communication apparatus has a distribution range of said key information such that said outputted key information can be acquired.

The present invention also provides a system including: a communication apparatus; an information display apparatus configured to display information transmitted from said communication apparatus; said communication apparatus including, a key information input unit configured to input key information outputted by said information display apparatus, and authentication information producing unit configured to produce authentication information used to authenticate said communication apparatus by employing said key information, said information display apparatus including, a key information producing unit configured to produce said key information, a key information output unit configured to output said produced key information, an authentication information receiving unit configured to receive said authentication information, an authenticating unit configured to authenticate a communication apparatus by verifying whether or not said authentication information was formed based upon said key information; and a display information receiving unit configured to display information received from said authenticated communication apparatus, wherein said authenticated communication apparatus has a distribution range of said key information such that said key information outputted by said key information output unit can be received.

The present invention also provides an apparatus for use with an information display apparatus for displaying information received from a communication apparatus, the apparatus including: means for producing key information used to authenticate said communication apparatus; means for distributing said key information; means for receiving authentication information for authenticating said communication apparatus; means for authenticating said communication apparatus by verifying whether or not said authentication information was formed based upon said key information; and means for receiving display information of said authenticated communication apparatus to display information, wherein said authenticated communication apparatus has a distribution range of said key information such that said outputted key information can be acquired.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Referring now to the drawings, embodiments of the present invention will be described. It should be understood that these embodiments do not restrict the technical scope and spirit of the present invention.

In embodiments of the present invention, participants of a conference each bring communication devices, such as notebook PCs and PDAs having communication functions. A presenter transmits electronic presentation data which has been stored in his own communication apparatus to an information apparatus, such as a projector, a television, a monitor, a speaker, or the like to display the data on the information output apparatus. The expression "display" used herein implies that images, sound (including voices), characters, and other general information are communicated to participants who are present. In such electronic presentations, information output devices execute authentication process operations, to allow or reject display of data.

Figure 1A:
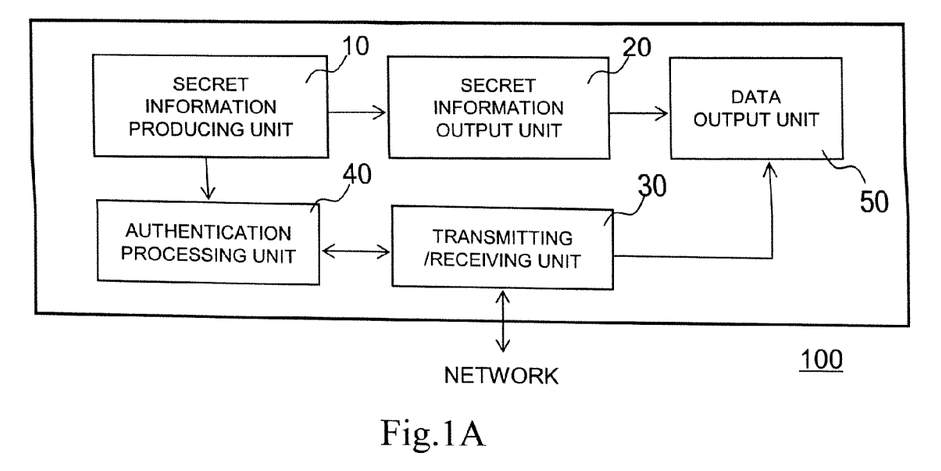
FIG. 1A and FIG. 1B are block diagrams for schematically indicating an arrangement of an information output apparatus 100, and an arrangement of a communication apparatus 101, according to a first non-limiting embodiment of the present invention.

The first non-limiting embodiment will now be described. FIG. 1A is a schematic block diagram for showing an arrangement of an information output apparatus 100 according to a first non-limiting embodiment of the present invention. The information apparatus 100 is provided with a secret information producing unit 10, a secret information output unit 20, a transmitting/receiving unit 30, an authentication processing unit 40, and a data output unit 50. In this embodiment, the information output apparatus 100 may correspond to a projector or the like by which images are projected onto a screen (not shown) by the data output unit 50.

Figure 1B:
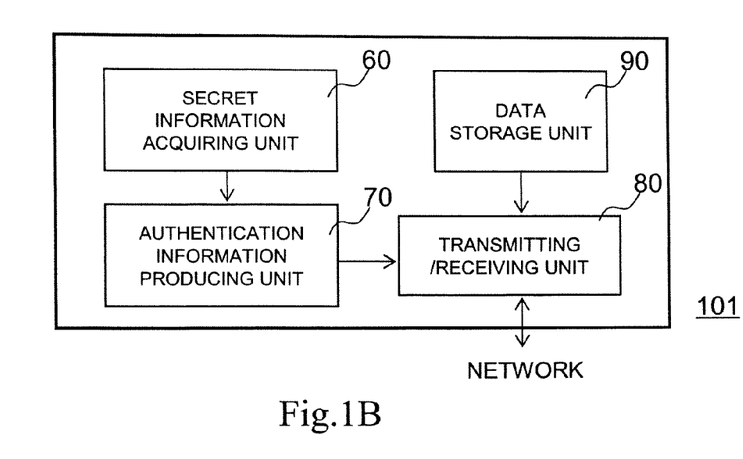

FIG. 1B is a schematic block diagram for showing an arrangement of a communication apparatus 101 that is capable of wireless communication with the information output apparatus 100 described in FIG. 1A. The communication apparatus 101 is equipped with the secret information acquiring unit 60, an authentication information producing unit 70, a transmitting/receiving unit 80, and a data storage unit 90. In this first embodiment, the communication apparatus 101 corresponds to a PC, a PDA, or the like, which is wirelessly connected to the information output apparatus 100.

The secret information producing unit 10 produces secret information. The secret information may include any combination of characters, numerals, symbols, and figures. For example, a character strain such as "RFYOHR#104" may be employed as the secret information. In this example, characters, numerals, and symbols are all arranged. However, it is possible to have only characters, only numerals, only symbols, or only figures. Alternatively, figures such as a circle, a polygon, a barcode, or other common symbols may be employed (alone or in combination) as the secret information.

The secret information producing unit may include a random number generator that generates a random value for the secret information, or an apparatus for generating secret information in accordance with a preset algorithm. If an algorithm is used to produce the secret information, the algorithm itself or a parameter used in the algorithm must be kept secret. If either the algorithm or the parameter employed in the algorithm is known, it is possible that randomly generated secret information may be predicted from previously used secret information.

The secret information producing unit 10 automatically produces secret information when the information output apparatus 100 is initiated. Alternatively, the secret information producing unit 10 may be instructed to generate secret information by a participant, a sponsor, or other user.

For instance, a button used to instruct the secret information producing unit 10 to generate secret information may be provided on the information output apparatus 100. When a participant pushes the button, the secret information producing unit 10 produces the secret information. Additionally, since plural sets of the buttons may be provided with the information output apparatus 100, the secret information producing unit 10 may produce the secret information in response to anyone of the plural buttons being selected, or in response to a predetermined sequence of buttons being selected.

The secret information output unit 20 outputs the secret information such that the output of secret information may be recognized only by either the communication apparatus 101 or the participants. To make sure that the secret information may be recognized only by the participants, the information output apparatus 100 may output the secret information only within a specified range. Such a specified range may include a range physically located in proximity to the information output apparatus 100.

For example, while the information output apparatus 100 is installed inside a room where a conference is held, the information output apparatus 100 may project the secret information on the screen. As a result, only participants located within the room may acquire the secret information. In this non-limiting example, the secret information output unit 20 may correspond to a projecting unit of a projector. It should be noted that the information output apparatus 100 may be a portable apparatus, and is not confined to installation in a presentation room. For example, the information output apparatus 100 may output the secret information by sound, so that only participants who are located in proximity to the information output apparatus 100 may receive the signal. In this non-limiting example, the secret information output unit 20 corresponds to a speaker.

Alternatively, the secret information output unit 20 may include a compact liquid crystal display positioned in the housing of the information output apparatus 100. In this case, a presenter or other participant of the conference may rewrite the secret information on another output means to enlarge the display, or may read the secret information to inform the other participants of the secret information.

The secret information output unit may alternatively be realized by combining plural sets of the above-described output devices. For example, the secret information may be alternatively displayed on the compact liquid crystal display provided in the housing and may also be outputted as sound from the speaker. As a result, all authorized participants may be aware of the secret information.

To prevent an unauthorized third party from obtaining the secret information, the output of the secret information apparatus may be controlled by an operator of the information output apparatus 100. For instance, a button may be provided on the housing of the information apparatus 100, and the secret information may be displayed only when the operator pushes this button. Alternatively, for example, after a certain period of time has passed since the operator pushed the secret information button, the secret information may disappear from display. Additionally, the button may be configured such that when the operator presses on it a second time, the secret information disappears from display. Other equivalent methods of stopping the display of the secret information may also be employed.

When the output information apparatus 100 is equipped with a remote control device, the operator may control display or non-display operations of the secret information by operating the remote control apparatus.

The secret information acquiring unit may correspond to an input apparatus such as, for example, a keyboard or a touch panel. In this case, when a participant acquires the secret information he may input it using the keyboard or the touch panel.

Both the secret information output unit 20 and the secret information acquiring unit 60 may be realized by input/output interfaces that are connected by a wireless communication means operable by electromagnetic waves, ultrasonic waves, infrared rays, or other ways known to those of skill in the art. This wireless communication means may communicate within a short distance, namely within a single conference room. In this case, the secret information output unit 20 transmits the secret information only to the communication apparatus 101 located in the vicinity of the secret information output unit 20. As a result, the communication apparatus 101 may directly acquire the secret information outputted by the secret information output unit 20 without being seen by any of the participants.

The transmitting/receiving unit 30 receives authentication information from the communication apparatus 101. The authentication information is generated by the communication apparatus 101 based upon the secret information. The authentication processing unit 40 authenticates the communication apparatus 101 by verifying the authentication information. The verification of authentication information may use, for example, the Public Key Cryptosystem or the Common Key Cryptosystem, as non-limiting examples. In this example, authentication information may correspond to information formed by applying a digital signature to secret information.

The communication apparatus 101 authenticated by the authentication processing unit 40 may transmit presentation information to the information output apparatus 100. The information output apparatus 100 projects the presentation information transmitted from the authenticated communication apparatus 101 to the display, such as a screen. When a communication apparatus is not authenticated by the authentication processing unit 40, the information output apparatus 100 does not receive the presentation information and does not display the presentation information on the screen.

In the non-limiting example of FIG. 1A, the information apparatus 100 includes a single appliance. Alternatively, the information output apparatus 100 may be arranged by combining multiple appliances, such as a projector having a conventional image projection function with a PC connected to the projector. In this alternative non-limiting example, the data output unit 50 shown in FIG. 1A corresponds to the projector, the secret information producing unit 10 and the secret information output unit 20 corresponds to software operated in the PC, and the transmitting/receiving unit 30 may correspond to a wireless communication apparatus provided in the PC.

As a result of the configuration of the first embodiment, it is possible to prevent non-participants of a presentation from obtaining the secret information. At the same time, it is possible to enable participants present within a conference room or within a vicinity of the information output apparatus to easily obtain the secret information. As a result, it is possible to prevent both intentional and unintentional disturbance of the presentation.

Figure 2:
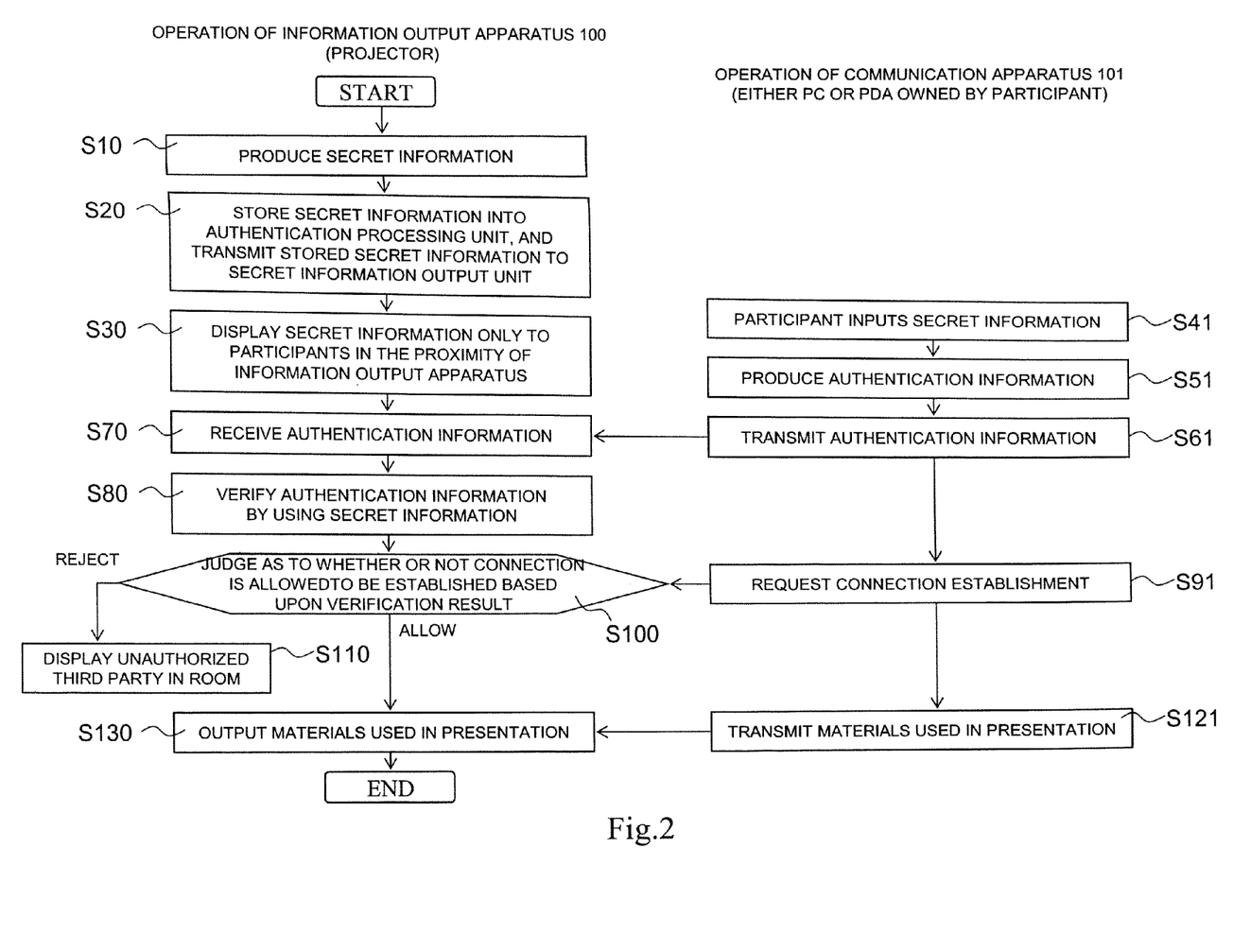
FIG. 2 is a flowchart for describing operations of both the information output apparatus 100 and the communication apparatus 101, and also for explaining communication process operations executed between elements 100 and 101.

Referring to FIG. 1A, FIG. 1B, and FIG. 2, a description is made of operations of both the information output apparatus 100 and the communication apparatus 101 according to the first non-limiting embodiment. FIG. 2 represents a flowchart for describing both the operations of the information output apparatus 100 and the communication apparatus 101 of the participant, and a communication operation performed between the devices 100 and 101. When the information output apparatus 100 is initiated, the secret information producing unit 10 produces secret information in step S10.

The secret information is sent to the authentication processing unit 40 to be stored therein, and is transmitted to the secret information output unit 20 in step S20.

Next, the secret information output unit 20 outputs the secret information such that the secret information may be recognized only by authorized participants in step S30. For example, the secret information output unit 20 may project the secret information onto a screen within the conference room so that only participants of the conference may acquire the secret information. Also, if the secret information output unit 20 is a speaker, the secret information output unit 20 may output the secret information aurally, such that only the participants may hear the secret information. If the secret information unit 20 includes a compact liquid crystal display, a participant may read the secret information displayed on the compact liquid crystal display, and may write the secret information on a blackboard or other display means that is visible to the participants. The secret information could then be erased, so that it is not distributed to unauthorized third parties.

With regard to authentication, when the participants acquire the secret information, the participants input the secret information into their own communication apparatuses 101 in step S41. For example, the participants may enter the secret information into the secret information acquiring unit 60 by a keyboard or a touch panel, or other similar device known to those of skill in the art.

If both the secret information output unit 20 and the secret information acquiring unit 60 correspond to input/output interfaces connected via wireless communication means, the participants do not need to enter the secret information because the secret information is automatically transmitted/received. In this case, while the information output apparatus 100 controls the output power, the information output apparatus transmits the secret information within only a limited range, such that only participants in the given range may obtain the secret information.

The authentication information producing unit 70 produces authentication information based upon the secret information in step S51. The transmitting/receiving unit 80 transmits the produced authentication information to the information output apparatus 100 in step S61. The transmitting/receiving unit 30 of the information output apparatus 100 receives the authentication information in step S70. The authentication processing unit 40 verifies the authentication information based upon the secret information in step S80.

The process operations defined from steps S51 to S80 may be executed by using either the Public Key Cryptosystem, the Common Key Cryptosystem, or their equivalents, as non-limiting examples.

When the Public Key Cryptosystem is used, the information output apparatus 100 previously has a public key of a participant, and the communication apparatus 101 previously has a secret key of the participant. In step S51, the authentication information producing unit 70 produces the authentication information such that a digital signature is applied to the secret information based upon the individual's secret key. In step S61, the communication apparatus 101 transmits the secret information including the digital signature as the authentication information to the information output apparatus 100. In step S70, the information output apparatus 100 receives the authentication information. In step S80, the authentication processing unit 40 confirms the digital signature based upon a public key of the owner of the communication apparatus that transmits the authentication information. As a result, the authentication processing unit 40 can confirm that the secret key of the authorized participant has been stored and the communication apparatus 101. Furthermore, since the authentication processing unit 40 confirms the contents of the secret information including the digital signature, the authentication processing unit 40 can confirm that the owner of the communication apparatus 101 is aware of the secret information.

In the Common Key Cryptosystem, the information output apparatus 100 and the communication apparatus 101 previously stores secret keys of a participant. In step S51, the authentication information producing unit 70 produces authentication information such that the secret information is encrypted by the individual's secret key. In step S61, the communication apparatus 1010 transmits the encrypted secret information as authentication information to the information output apparatus 100. In step S70, the information output apparatus 100 receives the authentication information. In step S80, the authentication processing unit 40 decodes the received authentication information using the transmitted secret key of the participant. When the decoded authentication information is authentic to the secret information produced by the secret producing unit 10, the authentication processing unit 40 determines that the person who sent the authentication information is an authorized participant.

When a plurality of participants use a common secret key, there is a certain possibility that one joint owner of the key who does not know the secret information intercepts the authentication information transmitted by the other joint owners, and transmits the intercepted authentication information as his own authentication information. In this case, the information output apparatus 100 may erroneously determine that this unauthorized user is an authorized participant. Accordingly, each participant's secret key should be unique relative to the secret keys of the other participants.

Additionally, for improved security, the secret key may be set to change in accordance with a specified elapsed time. For example, a secret key may be changed synchronously with an algorithm that is commonly used between the information output apparatus 100 and the communication apparatus 101.

Both the Public Key Cryptosystem and the Common Key Cryptosystem may simplify communications between the communication apparatus 101 and the information output apparatus 100 in the authentication process operation. As indicated by arrows in FIG. 2, it is sufficient that the communication apparatus 101 merely transmits the authentication information to the information output apparatus 100, and other communications are no longer required. Additionally, a communication from the information output apparatus 100 to the communication apparatus 101 is no longer required. Therefore, it is possible to realize the transmitting/receiving unit 30 as only a receiving unit, as the information output apparatus 100 no longer requires a transmission function. Also, the transmitting/receiving unit 80 of the communication apparatus 100 no longer requires a receiving function. Therefore, the transmitting/receiving unit 80 may be realized as a transmitting unit 80.

Since either a public key or a secret key of a participant should previously be stored in the information output apparatus 100 using either the Public Key Crypto System or the Common Key Crypto System, for example, it is possible that a set up operation is cumbersome. To alleviate this cumbersome set up, it is possible to develop a "challenge response system." When the challenge response system is employed, the transmitting/receiving unit 30 should include the transmission function, and the transmitting/receiving unit 80 should include the reception function.

More precisely, the information output apparatus 100 transmits individual random values as challenges to the communication apparatus 101. The communication apparatus 101 encrypts the transmitted random value while using the secret information as an encryption key. The communication apparatus 101 then returns this encrypted random value as a response to the information output apparatus 100. The information output apparatus 100 decodes the returned response while the secret information is used as the encryption key.

As a result, when the value obtained by decoding the response is authentic to the random value transmitted as the challenge, the information output apparatus 100 authenticates that the communication apparatus 101 is an authorized communication apparatus. Therefore, it is possible to obviate the need to previously store public keys or secret keys for each participant.

It should also be noted that the above-described authentication methods merely correspond to non-limiting examples of authentication methods. Other authentication methods may be employed. That is, the information output apparatus 100 may confirm that the same secret information is owned by the communication apparatus 101 in an alternative authentication method.

Next, the communication apparatus 101 requests the information output apparatus 100 to allow an establishment of a connection in step S91. The information output apparatus 100 judges whether the connection establishment is permissible, based on a verification result of authentication information in step S100. In other words, the information output apparatus 100 enables the establishment of a connection when the connection is requested by an authorized participant. On the other hand if the requester is an unauthorized participant, the information output apparatus 100 rejects the request for a connection.

When the communication output apparatus 100 determines that the communication apparatus 100 belongs to an authorized participant, the communication apparatus 101 transmits materials for presentation to the information output apparatus 100 in step S121. At this time, the communication apparatus 101 encrypts the data for presentation using the encrypt key based upon the secret key. Therefore, it is possible to prevent an unauthorized third party who does not know the secret information from stealing the presentation materials. The information output apparatus 100 projects the materials for presentation transmitted from the communication apparatus 101 to the display, such as a screen, from the data output unit 50 in step S130.

Additionally, after step S100, the information output apparatus 100 may notify an authorized user of a connection establishment. In this case, in step S121, the communication apparatus 101 that has received the notification of connection establishment transmits the materials for presentation to the information output apparatus 100.

Alternatively, the information output apparatus 100 may produce an encryption key without using the secret information, and may distribute this produced encryption key to the authenticated communication apparatus 101. However, it is preferable that both the information output apparatus 100 and the communication apparatus 101 produce an encryption key based upon the commonly used secret information using the same algorithm. Therefore, it is possible to avoid new distribution of an encryption key to the communication apparatus 101.

As a result of the verification in step S80, if the authentication processing unit 40 determines that the owner of the communication apparatus 101 is not an authorized participant, the information output apparatus 100 may prevent establishment of the connection in step S110. In this case, the information output apparatus 100 may also send a message to the liquid crystal display that an authorized third party is present. Additionally, the information output apparatus 100 may project a message that an unauthorized third party is present on the display, such as a screen, via the data output unit 50. If the information output apparatus 100 is equipped with a speaker, the information output apparatus 100 may aurally announce that an unauthorized third party is present. Additionally, it is possible for the information output apparatus 100 to display an identifier (for example, an address) of a communication apparatus owned by the unauthorized third party. As a result, the communication apparatus of the unauthorized third party cannot be connected to the information output apparatus 100. Also, it is possible to precisely identify an unauthorized user's communication apparatus.

According to the non-limiting first embodiment, the secret information is produced only once, when the information output apparatus 100 is initiated. Therefore, it is possible for a participant joining the conference midway through may obtain the secret information from an authorized user that has been present. However, it is also possible that a participant who has left the conference midway through may unwittingly disclose the secret information to an unauthorized third party. To stop this problem, the secret information is properly altered.

For example, a button used to update the secret information may be provided with the information output apparatus 100. If large quantities of participants are exchanged for new participants, the presenter may push this button to produce new secret information. A presentation may then be commenced through the process steps shown in FIG. 2.

To change the secret information, a timer may also be employed in the secret information producing unit 10, by which the secret information may be changed in a periodic manner. To update the secret information, new secret information may be encrypted while the previous secret information may be used as the encryption key. Therefore, the encrypted secret information may be transmitted to the communication apparatus 101. The communication apparatus 101 may automatically acquire new secret information based upon the previous secret information. As a result, even when the secret information is changed, the participants need not re-enter the new secret information.

Alternatively, when a communication apparatus 101 of a present interrupts a connection established between the communication apparatus 101 and the information output apparatus 100, secret information may be changed. In this case, when a presenter interrupts the connection between his own communication apparatus 101 and the information output apparatus 100, the secret information is changed. Any of the above-described methods of updating and changing the secret information may be used.

Since the secret information is updated, even if a participant leaves his seat midway through a conference and accidentally discloses the secret information to an unauthorized third party, the unauthorized third party cannot participate in the conference because the unauthorized third party cannot learn of the secret information that has been updated.

In this first non-limiting embodiment, the information output apparatus 100 may correspond to the projector that projects the images. However, the information output apparatus of the present invention is not limited only to a projector. In other words, the information outputted from the information output apparatus 100 is not limited only to an image, but may include sound as well. The information outputted by the information output apparatus 100 may also include information made by combining voice, sound, and an image, namely a video signal. Furthermore, the information output apparatus 100 may transmit information to the communication apparatus 101 located near the information output apparatus 100 wirelessly without outputting any one of an image, voice, or sound. In this alternative case, the communication apparatus 101 outputs a content of a presentation to the respective displays.

Before a conference begins, it is possible that information such as a name of a presenter, a title of the presentation, a starting time and the end time of the presentation may be projected on the screen for the information of the participants. The information output apparatus 100 may display secret information that is superimposed with the above-described information. In this alternative case, the data output unit 50 of FIG. 1 reads the secret information from the secret information output unit 20 and displays the secret information on the screen, while the secret information is superimposed on the information that is displayed.

Figure 3:
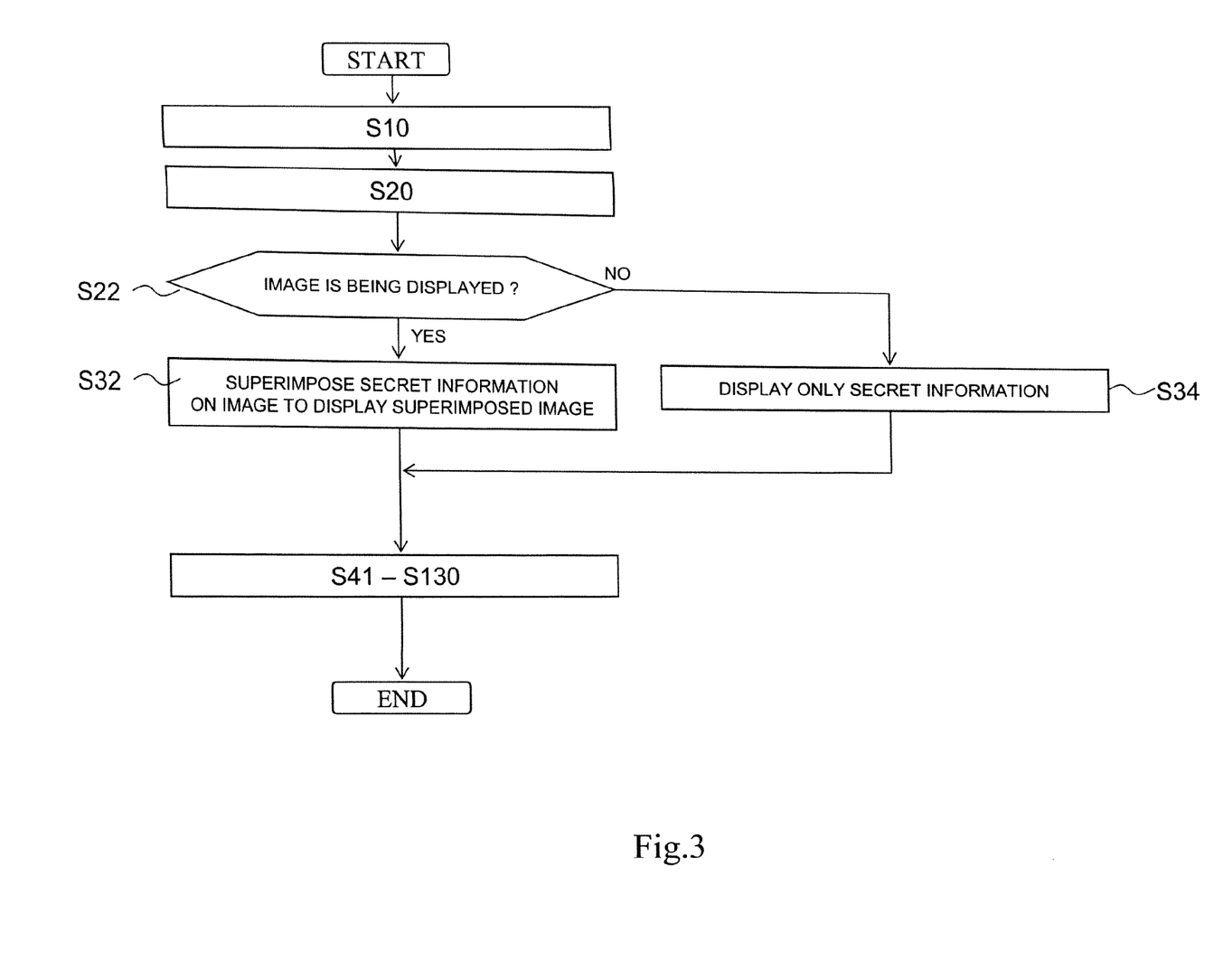
FIG. 3 is a flowchart for describing process operations executed when secret information is displayed by being superimposed with information, such as a name of a presenter.

FIG. 3 is a flowchart for explaining a process operation executed when secret information is displayed superimposed on information such as the presenter's name. After the process defined in steps S10 and S20 shown in FIG. 2 are executed, the secret information output unit 20 determines if the data output unit 50 has projected the information such as the name of the presenter on the screen in step S22.

The data output unit 50 displays the secret information while the secret information is superimposed on the other information in step S32. On the other hand, if the data output unit 50 projects no information, the data output unit 50 displays only the secret information in step S34. Process operations defined from steps S41-S130 illustrated in FIG. 2 are also executed.

Second Embodiment

Figure 4:
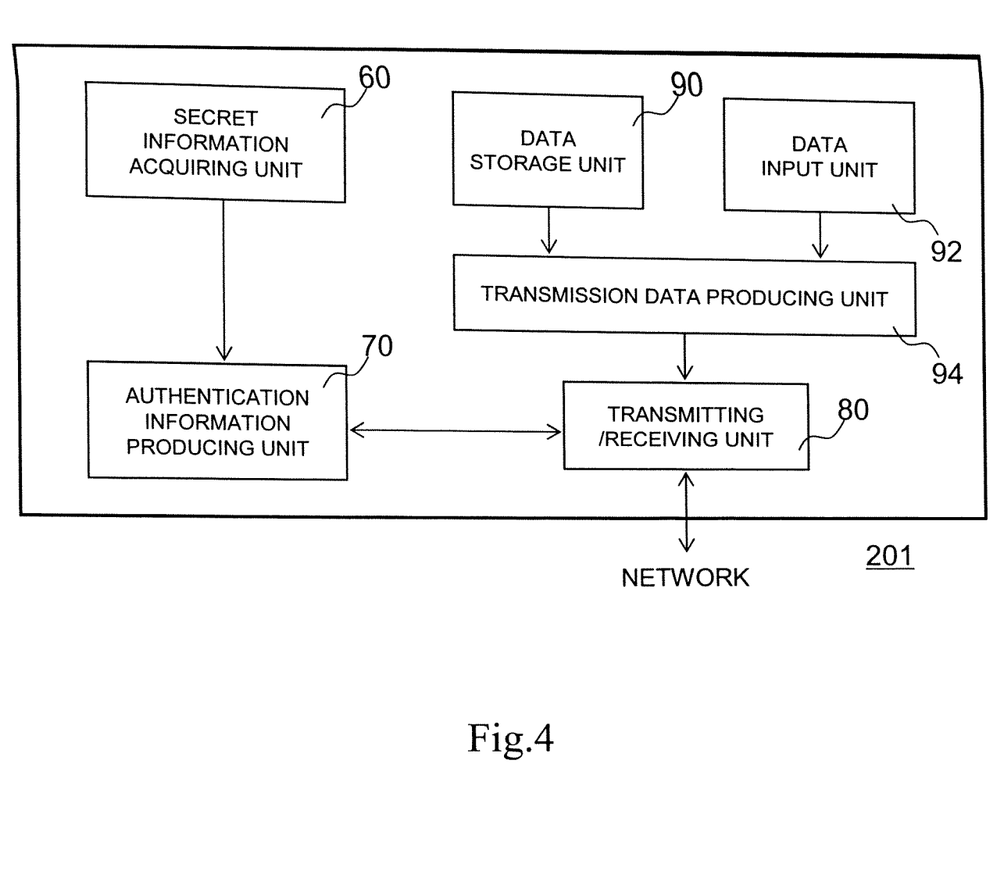
FIG. 4 is a block diagram for schematically representing an arrangement of a communication apparatus 201 according to a second non-limiting embodiment of the present invention.

FIG. 4 is a schematic block diagram for indicating an arrangement of a communication apparatus 201 according to the second embodiment of the present invention. An information output apparatus 100 (not shown in FIG. 4) is similar to the information output apparatus 100 illustrated in FIG. 1A.

The communication apparatus 201 according to the second embodiment may transmit data prepared by the presenter, as well as data entered during the presentation to the information output apparatus 100.

The communication apparatus 201 is further equipped with both a data input unit 92 and a transmission unit producing unit 94, in addition to the structural elements of the communication apparatus 101 shown in FIG. 1B. The data input unit 92 is equipped to input data into the communication apparatus 201. The transmission data producing unit 94 produces data to be transmitted to the information output apparatus 100 based upon both data that is previously stored in a data storage unit 90 and data that is inputted into the data input unit 92. At this time, the data which has been stored in the data storage unit 90 may be superimposed with the data that is entered from the data input unit 92. The superimposed data may be subsequently transmitted to the information output apparatus 100. Also, the transmission data producing unit 94 may alternatively select any one of the data storage unit 90 and the data input unit 92 to transmit the selected data to the information output apparatus 100.

For instance, the data input unit 92 is a sound input apparatus, such as a microphone, and the information output apparatus 100 is an apparatus that may include the capability of outputting both image data and sound data. Examples include a projector equipped with a speaker, or a television. The communication apparatus 201 transmits both image data of the data storage unit 90 and sound data inputted into the data input 92 to the information output apparatus 100. The information output apparatus 100 outputs both the image data and the sound data. As a result, a presenter may display the image data on the information output apparatus 100, while an explanatory speech accompanies the display. The presenter may more effectively carry out the presentation according to the non-limiting second embodiment.

If the secret information is outputted as sound, the data input unit 92 automatically inputs the sound. The authentication information producing unit 70 recognizes the secret information from the sound, and produces the authentication information based upon the secret information. As a result, the participants are no longer required to input the secret information.

For example, the data input unit 92 may correspond to an image input apparatus, such as a camera. In this case, the transmission data producing unit 94 may select the image data that has been previously stored in the data storage unit 90, as well as image data that has been photographed by the data input unit 92. As a consequence, when the presenter properly switches the image data that has been previously stored in the data storage unit 90 and the image data that has been photographed by the data input unit 92, the presenter may perform the presentation. For instance, if a presenter creates a hand-written illustration during the presentation, the presenter may display this hand-written illustration.

If the secret information is outputted as an image, the data input unit 92 automatically inputs this image. The authentication information producing unit 70 recognizes the secret information from this image, and produces the authentication information based upon the secret information. As a result, participants are no longer required to input the secret information.

For example, if the secret information includes a bar code, the data input unit 92 may input the bar code. The authentication information producing unit 70 produces authentication information based upon the inputted bar code, and the transmitting/receiving unit 80 transmits the produced authentication information to the information output apparatus 100. The information output apparatus 100 decodes the authentication information to obtain the bar code, and authenticates the obtained bar code against a previously stored bar code in the information output apparatus 100. Therefore, the authentication process may be easily realized.

In the case where the data input unit 92 includes a video camera that inputs both image and sound, and the data storage unit 90 corresponds to a video tape that stores both image and sound. In this case, both the image and the sound are inputted into the data input unit 92 may be stored in the data storage unit 90. Alternatively, these images and sounds may be combined with each other, and the combined information may be transmitted to the information output apparatus 100.

If the secret information is outputted as a combination of image and sound, the data input unit 92 automatically inputs both the image and the sound. The authentication information producing unit 70 recognizes the secret information from both the inputted image and the inputted sound, and produces the authentication information based upon the secret information. As a result, participants are no longer required to input the secret information.

Based upon the verification result in the step S80 shown in FIG. 2, the contents of data that may be transmitted by the respective communication devices 201 may be restricted. For example, while the secret information is revealed only to a presenter, the communication apparatus 201 of the presenter may transmit both the image data that has been stored in the data storage unit and the sound data that is entered from the data input unit 92. On the other hand, the communication apparatus 201 belonging to another participant may transmit only the sound data entered from the data input 92. As a result, the information output apparatus 100 may ensure a smooth progress of the presentation by displaying only the image that is prepared by the announcing participant. Furthermore, since all of the participants may transmit the sound data to the information output apparatus 100, both the presenter and the other participants may exchange questions and answers relevant to the content of the presentation.

Third Embodiment

Figure 5A:
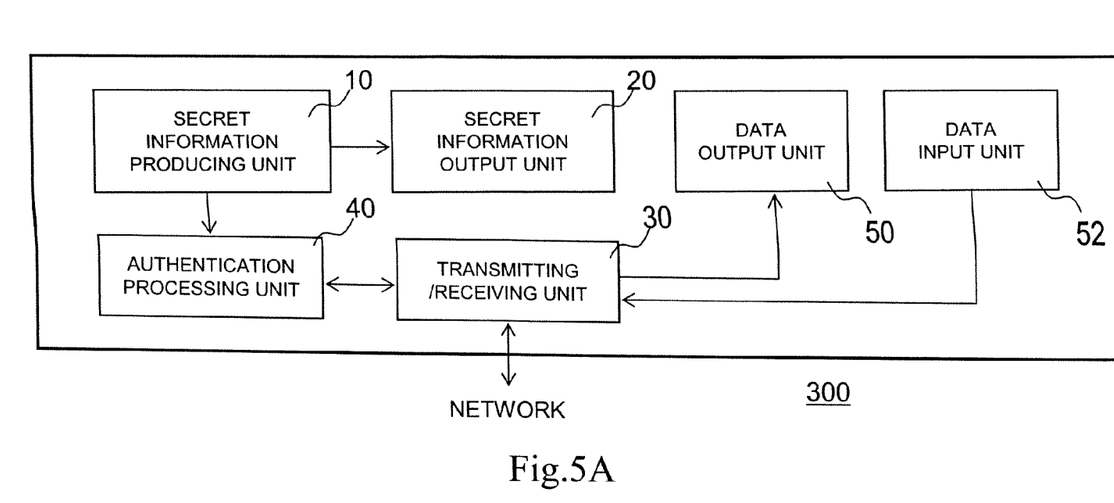
FIGS. 5A and 5B are block diagrams for schematically showing an arrangement of an information output apparatus 300 and an arrangement of a communication apparatus 301, according to a third non-limiting embodiment of the present invention.
Figure 5B:
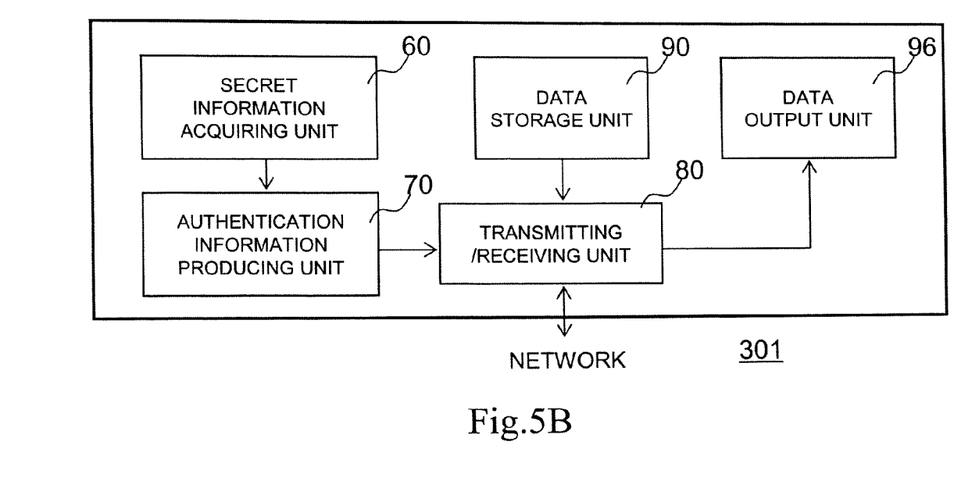

FIG. 5A and FIG. 5B are schematic block diagrams for indicating an arrangement of an information output apparatus 300 and an arrangement of a communication apparatus 301, according to a third non-limiting embodiment of the present invention. In the third embodiment, both the information output apparatus 300 and the communication apparatus 301 are provided with input functions.

The information output apparatus 300 is further provided for the data input unit 52 in addition to the structural elements of the information output apparatus 100 shown in FIG. 1. The communication apparatus 301 is further provided with the data output unit 96 in addition to the structural elements of the communication apparatus 101 shown in FIG. 1.

For instance, the information output apparatus 300 may include a projector equipped with a picture camera. In this case, the data output unit 50 of the information output apparatus 300 may correspond to a projection apparatus for projecting an image on a screen. The data input unit 52 of the information output apparatus 300 may correspond to a compact picture camera for photographing an image. The data input unit 52 may photograph a document printed on a paper, a drawing, or the like. An image photographed by the data input unit 52 may be projected onto the screen by the data output unit 50. The information output apparatus 300 may display secret information via the data output unit 50.

The communication apparatus 301 may be connected to the information output apparatus 300 such that communication is possible. As a result, the communication apparatus 301 may receive the image photographed by the data input unit 52, and then may display the received image on the data output unit 96. The data output unit 96 corresponds to, for example, a liquid crystal display of a PC. As a consequence, participants may view the content that is displayed on the screen from the data output unit 50 of the information output apparatus 300.

Furthermore, the communication apparatus 301 may record the image in the data storage unit 90. Accordingly, the participants may access the contents of the presentation as electronic data. The data storage unit 90 may correspond to, for example, the hard disk of a PC.

Fourth Embodiment

Figure 6:
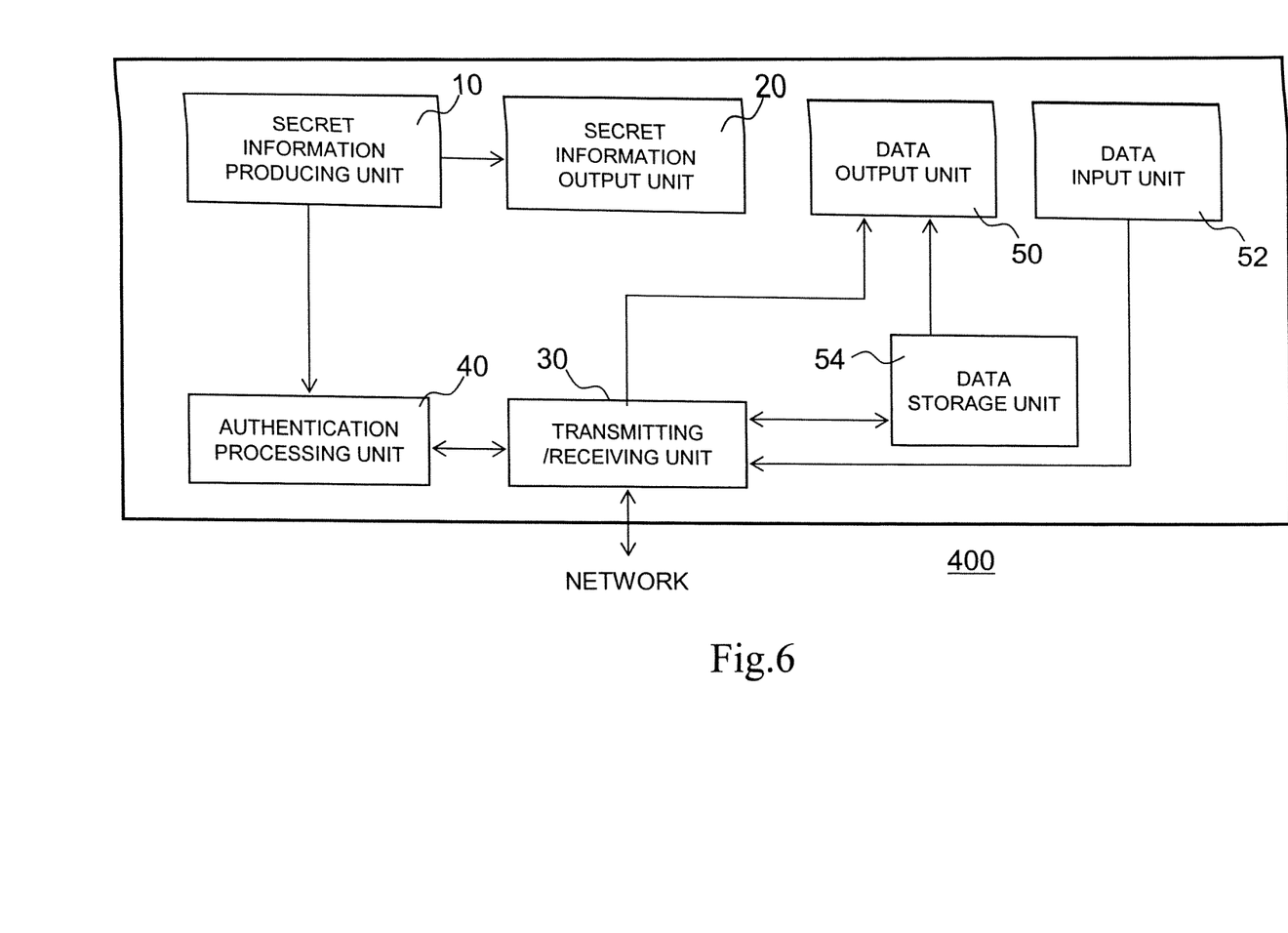
FIG. 6 is a block diagram showing an arrangement of an information output apparatus 400 according to a fourth non-limiting embodiment of the present invention.

FIG. 6 is a schematic block diagram indicating an arrangement of an information output apparatus 400 according to a fourth non-limiting embodiment of the present invention.

The information output apparatus 400 is provided with a data storage unit 54 in addition to the structural elements of the information output apparatus 300 shown in FIG. 5A. The data storage unit 54 may store data used for a presentation, which is transmitted by a presenter, and also image data photographed by the data input unit 52. A participant may access the data used for the presentation and the image data from the data storage unit 54 using the communication apparatus 301 shown in FIG. 5B. It should be understood that the above-described communication apparatus 301 may be replaced by either the communication apparatus 101, the communication apparatus 201, or other communication apparatus known to those of skill in the art.

When the data is read, security of presentation data and image data may be secured by using the flowchart shown in FIG. 2. For instance, in step S61, the communication apparatus 301 transmits authentication information to the information output apparatus 400. Next, in both step S70 and step S80, the information output apparatus 400 receives the transmitted authentication information and verifies the authentication information. In step S91, the communication apparatus 301 requests the information output apparatus 400 to establish a connection to require either the presentation data or the image data. In step S100, the information output apparatus 400 allows or rejects the request to establish a connection based upon the results of the verification.

If the connection request is allowed, the information output apparatus 400 encrypts either the presentation data or the image data based upon the secret information and transmits the encrypted data to the communication apparatus 301. As a result, when either the presentation data or the image data is transmitted from the information output apparatus 400 to the communication apparatus 301, the security of these data may be secured.

Alternatively, the authentication process operation and the encrypting operation may be selectively carried out, depending on the type of data that is transmitted/received between the information output apparatus 400 and the communication apparatus 301. For example, if presentation data is transmitted, the information output apparatus 400 may execute both the authentication process operation and the encrypting operation. On the other hand, if image data photographed by the data input unit 52 is transmitted, the information output apparatus 400 may transmit the photographed image data to the communication apparatus 301 without executing both the authentication operation and the encrypting operation.

Additionally, it is possible that only a presenter may be made aware of the secret information, as a non-limiting alternative embodiment. As a result, the presenter may transmit the presentation data to the information output apparatus 400.

Alternatively, one presenter may download materials that have been used by another presenter from the information output apparatus 400 to bring back the downloaded materials. On the other hand, while other participants cannot transmit the materials to the information output apparatus 400 and cannot download the materials from the information output apparatus 400, these participants may view the image photographed by the data input unit 52 using their own communication devices 301. As previously explained, in accordance with the fourth non-limiting embodiment, the presenter may be distinguished from other participants.

So that only the presenter obtains the specific secret information, the secret information producing apparatus produces both secret information 1 used for the presenter and secret information 2 used for the participants, respectively. For example, the secret information 1 may be displayed on the compact liquid crystal display that is provided as the secret information output unit 20. As a result, only the announcing participant is able to obtain the secret information 1. The secret information 2 may be projected onto a screen or other display apparatus from the data output unit 50. Consequently, the other authorized participants may obtain the secret information 2.

If the communication apparatus 301 owns the secret information 1, the information output apparatus 400 may permit the communication apparatus 301 to transmit the data to the information output apparatus 400. The communication apparatus 301 may also download the data from the information output apparatus 400. On the other hand, if the communication apparatus 301 owns the secret information 2, the information output apparatus 400 may only enable the communication apparatus 301 to download the image data photographed by the data input unit 52.

Through the fourth embodiment, it is possible to prevent participants other than the presenter from obtaining the presentation data in a permanent fashion. Also, it is possible to avoid intentional or negligent disturbance of the presentation by participants other than the presenter.

Fifth Embodiment

Figure 7:
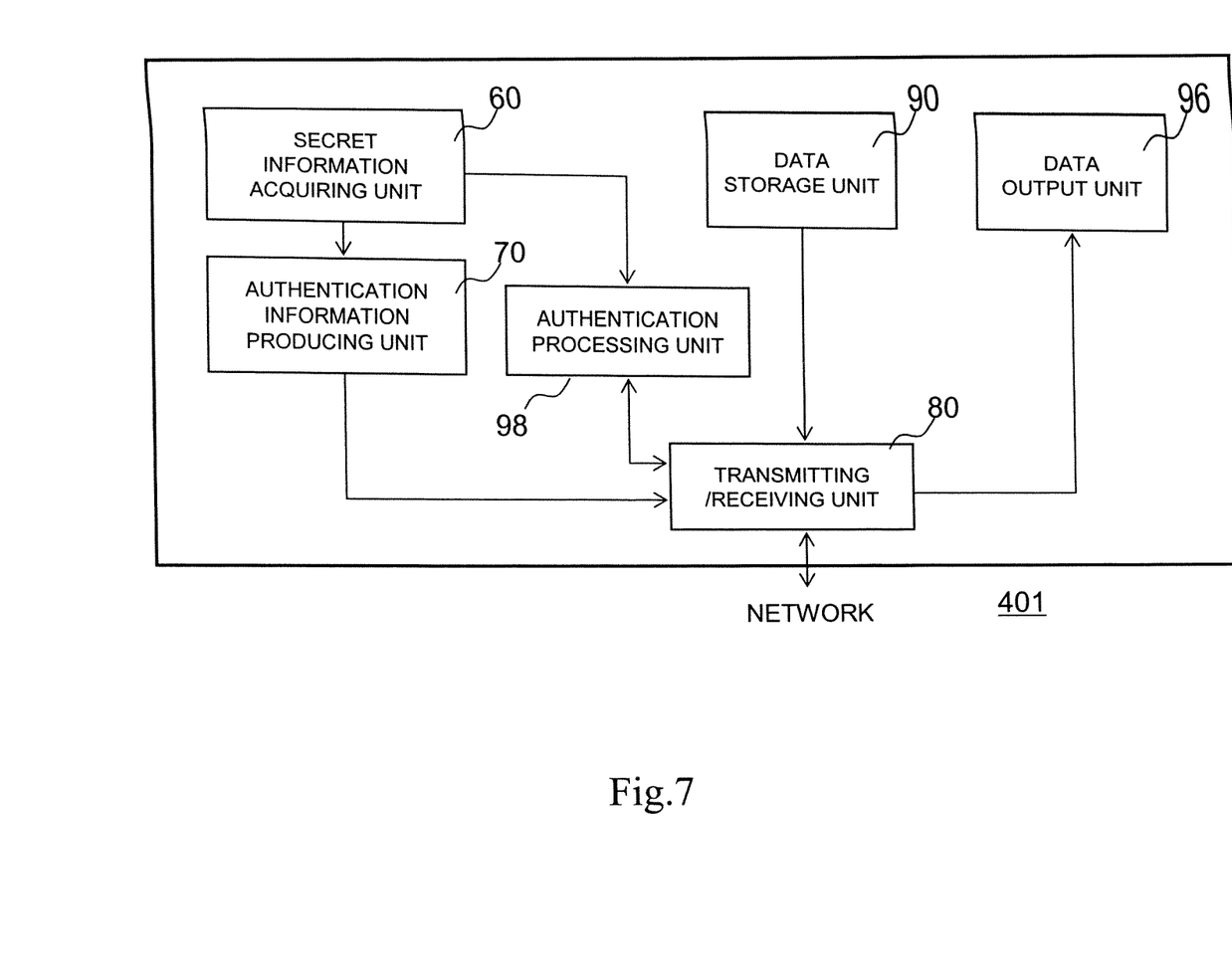
FIG. 7 is a block diagram indicating an arrangement of a communication apparatus 401 according to a fifth non-limiting embodiment of the present invention.

FIG. 7 is a schematic block diagram indicating an arrangement of a communication apparatus 401 according to a fifth non-limiting embodiment of the present invention. The communication apparatus 401 is provided with an authentication processing unit 98 in addition to the structural elements of the communication apparatus 301 shown in FIG. 5B. The communication apparatus 401 corresponds to a communication apparatus used for a presenter. Communication devices used for participants who are not presenters may be selected from any one of the communication devices 101, 201, 301, or 401. For the discussion below, it is assumed that the communication apparatus of the participants other than the presenter is the communication apparatus 402. However, this embodiment is not limited thereby.

The authentication process unit 98 verifies authentication information transmitted from the communication apparatus 402 to allow or reject a connection between the communication apparatus 402 and the communication apparatus 401. As a result, the communication apparatus 402 having secret information is not connected to the information output apparatus, but can directly receive data used for a presentation from the communication output apparatus 401.

For instance, a description will be made of operations of both the communication apparatus 401 and the communication apparatus 402 with reference to the flowchart illustrated in FIG. 2. In FIG. 2, instead of the information output apparatus 100, the communication apparatus 401 executes the process operations defined from step S10 to step 100. Additionally, instead of the communication apparatus 101 in FIG. 2, the communication apparatus 402 executes the process operations defined from step S41 to step S91. In step S20, the secret information is stored into both the authentication information producing unit 70 and the authentication processing unit 98.

In step S100, when the communication apparatus 401 authorizes a connection establishing request issued from the communication apparatus 402, the communication apparatus 402 can download the presentation data from the data storage unit 90 (see FIG. 7) of the communication apparatus 401. On the other hand, in step S100, if the communication apparatus 401 rejects a connection establishing request issued from the communication apparatus 402, the communication apparatus 402 cannot download the presentation data from the data storage unit 90, because the communication apparatus 402 cannot be connected to the communication apparatus 401.

As a result, only an authorized user who possesses the secret information may permanently obtain the presentation data. Additionally, participants who possess the secret information may view the presentation data using their own communication devices 402.

In this fifth embodiment, the information that is transmitted/received is not limited only to the data used for the presentation. For example, a so-called "chat" may be carried out, in which short text messages are mutually transmitted/received between participants and a presenter. In this fifth embodiment, the chat may also be encrypted based upon the secret information. As a consequence, a third party who does not know the secret information cannot disturb the presentation or steal questions and answers made in the chats between the presenter and the participants.

In the above-described embodiments, an information output apparatus may be alternatively arranged such that a plurality of operation modes may be selected, while the plural operation modes contain a "secure mode" in which both the authentication process operation and the encrypting operation are carried out as shown in FIG. 2, and a "normal mode"

in which the security measures are not present. Either a presenter or a participant may select these operation modes in response to an environment in which a conference is held. For instance, if the possibility of data disturbance or data being stolen by a third party is very low, then the "normal mode" is selected. If there is a high risk of data disruption or data being stolen by a third party, the "secure mode" may be selected.

The information output apparatus, the information output system, and the information output method according to the present invention may avoid disturbance of a presentation by an unauthorized third party. Additionally, according to the present invention, it is possible to prevent theft of the presentation by an unauthorized third party.

Obviously, numerous modifications and variations of the present invention are possible in light of the above teachings. It is therefore to be understood that within the scope of the appended claims, the invention may be practiced otherwise than as specifically described herein.

The invention claimed is:

1. An apparatus for displaying information received from a communication apparatus within a presentation room and which information is to be presented to multiple users in the presentation room, comprising:
   a key information producing unit including a processor configured to produce key information used to authenticate said communication apparatus;
   a key information distributing unit including a processor configured to distribute said key information only to the presentation room;
   an authentication information receiving unit including a processor configured to receive authentication information from the communication apparatus in the presentation room;
   an authenticating unit including a processor configured to authenticate said communication apparatus by verifying whether or not said authentication information was formed based upon said key information;
   a display information receiving unit including a processor configured to receive display information from said authenticated communication apparatus; and
   an output unit to display the display information received from said authenticated communication apparatus to the multiple users in the presentation room;
   wherein said authenticated communication apparatus has a distribution range during reception of said key information such that said outputted key information can be acquired;
   wherein said key information distributing unit includes a display unit configured to visually display said key information, and the distribution range of said key information is such that said key information displayed on said display unit can be visually viewed within the presentation room.

2. The apparatus as claimed in claim 1, wherein said display unit converts said key information into a picture that can be displayed by said information display unit and superimposes said picture on an image of the display information.

3. The apparatus as claimed in claim 1, further comprising:
   a display panel, wherein said display unit displays said key information on said display panel as at least one of a character or an image.

4. The apparatus as claimed in claim 1, wherein said key information distributing unit further includes a sound output unit configured to output sound for distributing said key information, and the distribution range of said key information is such that a sound outputted by said output unit can be heard within the presentation room.

5. The apparatus as claimed in claim 1, wherein said key information distributing unit further includes a transmitting unit configured to transmit said key information by infrared transmission, and the distribution range of said key information is such that the infrared rays transmitted by said transmitting unit can be received within the presentation room.

6. The apparatus as claimed in claim 1, wherein the communication apparatus authenticated by said authenticating unit is further equipped with a display information transmitting unit configured to transmit the display information displayed by said display unit.

7. The apparatus as claimed in claim 6, wherein said display information transmitting unit encrypts the display information to be transmitted such that the encrypted display information can be decoded by said communication apparatus.

8. A system for displaying information comprising:
   a communication apparatus within a presentation room including information to be presented to multiple users in the presentation room;
   an apparatus within the presentation room to receive the information from the communication apparatus and comprising:
      a key information producing unit including a processor configured to produce key information used to authenticate said communication apparatus;
      a key information distributing unit including a processor configured to distribute said key information only to the presentation room;
      an authentication information receiving unit including a processor configured to receive authentication information from the communication apparatus in the presentation room;
      an authenticating unit including a processor configured to authenticate said communication apparatus by verifying whether or not said authentication information was formed based upon said key information;
      a display information receiving unit including a processor configured to receive display information from said authenticated communication apparatus; and
      an output unit to display the display information received from said authenticated communication apparatus to the multiple users in the presentation room;
      wherein said authenticated communication apparatus has a distribution range during reception of said key information such that said outputted key information can be acquired;
      wherein said key information distributing unit includes a display unit configured to visually display said key information, and the distribution range of said key information is such that said key information displayed on said display unit can be visually viewed within the presentation room.

9. The system as claimed in claim 8, wherein said display unit converts said key information into a picture that can be displayed by said information display unit and superimposes said picture on an image of the display information.

10. The system as claimed in claim 8, further comprising:
    a display panel, wherein said display unit displays said key information on said display panel as at least one of a character or an image.

11. The system as claimed in claim 8, wherein said key information distributing unit further includes a sound output unit configured to output sound for distributing said key information, and the distribution range of said key information is such that a sound outputted by said output unit can be heard within the presentation room.

12. The system as claimed in claim 8, wherein said key information distributing unit further includes a transmitting unit configured to transmit said key information by infrared transmission, and the distribution range of said key information is such that the infrared rays transmitted by said transmitting unit can be received within the presentation room.

13. The system as claimed in claim 8, wherein the communication apparatus authenticated by said authenticating unit is further equipped with a display information transmitting unit configured to transmit the display information displayed by said display unit.

14. The system as claimed in claim 13, wherein said display information transmitting unit encrypts the display information to be transmitted such that the encrypted display information can be decoded by said communication apparatus.

15. A method for displaying information received from a communication apparatus within a presentation room and which information is to be presented to multiple users in the presentation room, comprising:
producing, by a key information producing unit including a processor, key information used to authenticate said communication apparatus;
distributing, by a key information distributing unit including a processor, said key information only to the presentation room;
receiving, by an authentication information receiving unit including a processor, authentication information from the communication apparatus in the presentation room;
authenticating, by an authenticating unit including a processor, said communication apparatus by verifying whether or not said authentication information was formed based upon said key information;
receiving, by a display information receiving unit including a processor, display information from said authenticated communication apparatus; and
displaying, by an output unit, the display information received from said authenticated communication apparatus to the multiple users in the presentation room;
wherein said authenticated communication apparatus has a distribution range during reception of said key information such that said outputted key information can be acquired;
wherein said distributing said key information includes usually displaying, by a display unit, said key information, and the distribution range of said key information is such that said key information displayed on said display unit can be visually viewed within the presentation room.

16. The method as claimed in claim 15, wherein said displaying converts said key information into a picture that can be displayed by said information display unit and superimposes said picture on an image of the display information.

17. The method as claimed in claim 15, further comprising:
displaying, by a display panel, said key information as at least one of a character or an image.

18. The method as claimed in claim 15, wherein said key information distributing further includes outputting, by a sound output unit, sound for distributing said key information, and the distribution range of said key information is such that a sound outputted by said output unit can be heard within the presentation room.

19. The method as claimed in claim 15, wherein said key information distributing further includes transmitting, by a transmitting unit, said key information by infrared transmission, and the distribution range of said key information is such that the infrared rays transmitted by said transmitting unit can be received within the presentation room.

20. The method as claimed in claim 15, wherein the communication apparatus authenticated by said authenticating unit is further equipped with a display information transmitting unit configured to transmit the display information displayed by said display unit.

21. The method as claimed in claim 20, wherein said display information transmitting encrypts the display information to be transmitted such that the encrypted display information can be decoded by said communication apparatus.

* * * * *